United States Patent [19]

Watanabe et al.

[11] Patent Number: 5,204,943

[45] Date of Patent: Apr. 20, 1993

[54] IMAGE FORMING APPARATUS

[75] Inventors: Yoshihiko Watanabe; Kenjiro Fujita; Yasuro Takiura, all of Tokyo, Japan

[73] Assignee: Yokogawa Medical Systems, Limited, Tokyo, Japan

[21] Appl. No.: 581,148

[22] Filed: Sep. 10, 1990

Related U.S. Application Data

[63] Continuation of Ser. No. 368,390, Jun. 15, 1989, abandoned.

[30] Foreign Application Priority Data

Dec. 22, 1986 [JP] Japan ............................... 61-305771

[51] Int. Cl.$^5$ ............................................. G06F 15/20
[52] U.S. Cl. ................................. 395/118; 364/413.14
[58] Field of Search ............... 364/518, 521, 413.13, 364/413.14, 413.15, 413.19, 413.22, 413.23; 340/750

[56] References Cited

U.S. PATENT DOCUMENTS

| | | | |
|---|---|---|---|
| 4,135,247 | 1/1979 | Gordon et al. | 364/414 |
| 4,544,956 | 11/1985 | Shimizu | 364/518 X |
| 4,587,633 | 5/1986 | Wang et al. | 364/521 X |
| 4,709,332 | 11/1987 | Morrison et al. | 364/413.23 |
| 4,796,203 | 1/1989 | Roberts | 364/521 |
| 4,802,118 | 1/1989 | Honda | 340/750 X |
| 4,811,109 | 3/1989 | Shimizu et al. | 358/256 |

FOREIGN PATENT DOCUMENTS 57-55466  4/1982  Japan .

Primary Examiner—H. A. Herndon
Attorney, Agent, or Firm—Moonray Kojima

[57] ABSTRACT

An image forming apparatus is capable of starting image reconstruction simultaneously with the start of scan. A pipe-line system image forming apparatus having an intermediate buffer between a date acquition device and an image reconstruction device, and the apparatus is characterized in that there is provided a path for supplying data from the data acquisition device directly to the image reconstruction device, whereby the first scan data is sent also to the image reconstruction device simultaneously with sending data to the intermediate buffer so as to immediately start image reconstruction according to the scan data.

14 Claims, 2 Drawing Sheets

IMAGE FORMING APPARATUS

This is a continuation of application Ser. No. 368,390, filed Jun. 15, 1989, now abandoned.

TECHNICAL FIELD

This invention relates to the improvements in image forming apparatus applied to computer tomography and NMR imaging. More particularly, this invention relates to the image forming apparatus in which the time from when data acquisition is started until the first image is obtained is reduced in case of conducting acquisition of image forming data and image formation in parallel by pipe-line system.

BACKGROUND ART

In computer tomography and NMR imaging, first data for image formation on a detected body is acquired by scan using X-ray or nuclear magnetic resonance, and subsequently an image is reconstructed by a designated algorithm using these data. In case of continuously scanning the detected body plural times to acquire a plurality of scan data and reconstructing an image one by one according to the respective scan data, data acquisition and image reconstruction are conducted in parallel by a pipe-line system to achieve speeding up of the operation. At that time, as shown in FIG. 4, a large-capacity buffer memory 2 (intermediate buffer) comprising a magnetic disc device or the like is interposed between a data acquisition device 1 and an image reconstruction device 3 to absorb a difference in speed between the data acquisition operation and the image reconstruction operation. The reconstructed image is displayed on a display device 4. In the thus constructed apparatus, reconstruction of an image can not be started by the image reconstruction device until data for one scan at least is collected in the intermediate buffer, so that the time spent until the first reconstructed image is made longer for that. On the contrary, according to Scan & Recon system, image reconstruction is started simultaneously with the start of scan, so that the time spent until the first reconstructed image is obtained is made shorter. In this system, however, the next scan can not be started before image reconstruction is completed. Accordingly, this system is not suitable for use in continuously scanning plural times at high speed.

DISCLOSURE OF INVENTION

It is an object of the present invention to provide an image forming apparatus which is an image forming apparatus adopting a pipe-line system having an intermediate buffer between a data acquisition device and an image reconstruction device, in which image reconstruction can be started simultaneously with the start of scan.

The image forming apparatus of the present invention is characterized in that there is provided a path for supplying data from a data acquisition device directly to an image reconstruction device to send the first scan data also to the image reconstruction device simultaneously with sending data to an intermediate buffer, so that image reconstruction according to the scan data can be immediately started.

BEST MODE FOR CARRYING OUT THE INVENTION

Figure 1:
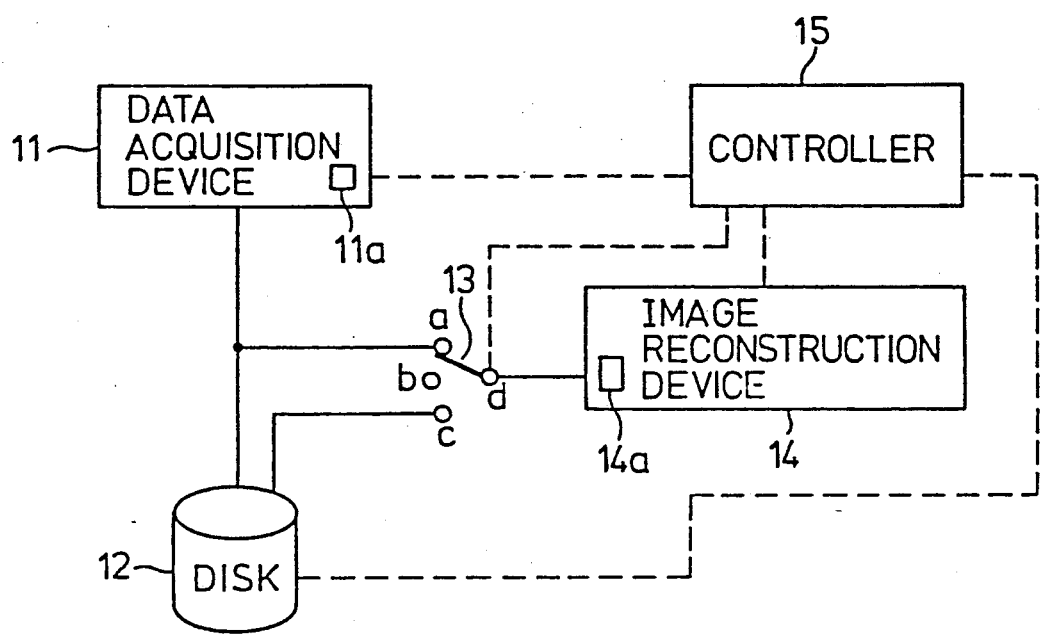
FIG. 1 is a conceptual block diagram of one embodiment of the present invention.

FIG. 1 shows the conceptual constitution of one embodiment of the present invention. In FIG. 1, a data acquisition device 11 is generally provided in computed tomography and NMR imaging apparatus and adapted to acquire scan data by continuously scanning a detected body plural times using X-ray or nuclear magnetic resonance. The device incorporates a buffer memory 11a having a capacity enough to store data for one scan. The scan data in the buffer memory 11a is transferred to a large-capacity intermediate buffer 12 formed by a magnetic disc or the like to be stored. The data transfer rate of the intermediate buffer 12 is far higher than the data acquisition rate of the data acquisition device 11. A change-over switch 13 is provided to supply the scan data transferred from the data acquisition device 11 to the intermediate buffer 12 or scan data stored in the intermediate buffer 12 to the image reconstruction device 14. The change-over switch 13 has three switching positions (a), (b), (c), whereby when the switch is placed at the position (a), the scan data transferred from the data acquisition device 11 to the intermediate buffer 12 can be supplied to the image reconstruction device 14, and when it is placed at the position (c), the scan data stored in the intermediate buffer 12 can be supplied to the image reconstruction device 14. The position (b) is the neutral position which is in the state of cutting off the supply of scan data. The image reconstruction device 14 is generally provided in computed tomography and NMR imaging apparatus, for example, and implemented by a special-purpose computer operated by a designated alogorithm. The image reconstruction device 14 incorporates a buffer memory 14a having a capacity enough to store data for one scan. The scan data supplied through the change-over switch 13 is stored in the buffer memory 14a and provided for image reconstruction. The speed of reconstructing one sheet of image by the image reconstruction device 14 is slower than the speed of acquiring data for one scan by the data acquisition device 11. The operation of the data acquisition device11, the intermediate buffer 12, the change-over switch 13 and the image reconstruction device 14 is controlled by a control device 15. A transmission path for a control signal is shown by a broken line. The control device 15 is implemented by a computer or the like.

The thus constructed image forming apparatus operates as follows. The data acquisition device 11 is adapted to acquire scan data by continuously scanning a detected body plural times and transfer the scan data to the intermediate buffer 12 through the buffer memory 11a. At this time, the first scan data is supplied also to the image reconstruction device 1e through the change-over switch 13 put in the state of being placed at the position (a) to be written in the buffer memory 14a. The image reconstruction device 14 starts image reconstruction simultaneously with writing data in the buffer memory 14a. Thus, the first sheet of image is reconstructed simultaneously with sending the first scan data to the intermediate buffer, so that the time from when scan is started until the first image is obtained can be reduced to that in case of Scan & Recon system. The change-over switch 13 is switched to the position (b) after the first scan data is supplied to the buffer memory 14a of the image reconstruction device 14 to separate the image reconstruction device 14 from the data acquisition device 11. As the operating speed of the image reconstruction device 14 is slower than that of the data acquisition device 11, at a point of this time, the image reconstruction device 14 is in the process of reconstructing the first sheet of image using the first scan data written in the buffer memory 14a. During this time, the scan data acquired successively by the data acquisition device 11 is transferred to the intermediate buffer 12 to be stored. The change-over switch 13 is switched to the position (c) every time the image reconstruction device 14 reconstructs one sheet of image, whereby the data for the next one scan is transferred from the intermediate buffer 12 to the image reconstruction device 14 to be provided for the next image reconstruction. Thus, acquisition of scan data and image reconstruction are carried out by pipe-line system.

Figure 2:
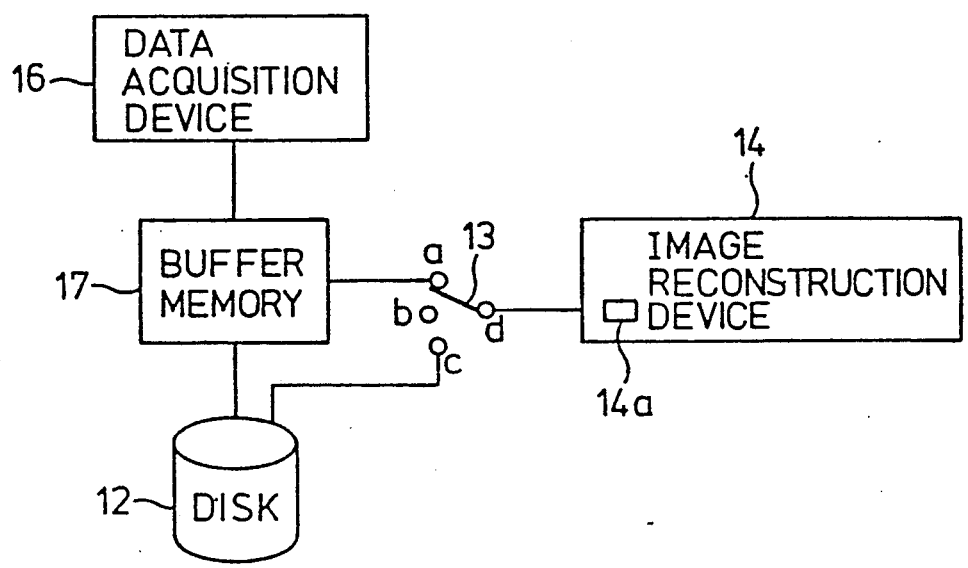
FIGS. 2 and 3 are conceptual block diagrams of the other embodiments of the present invention.
Figure 3:
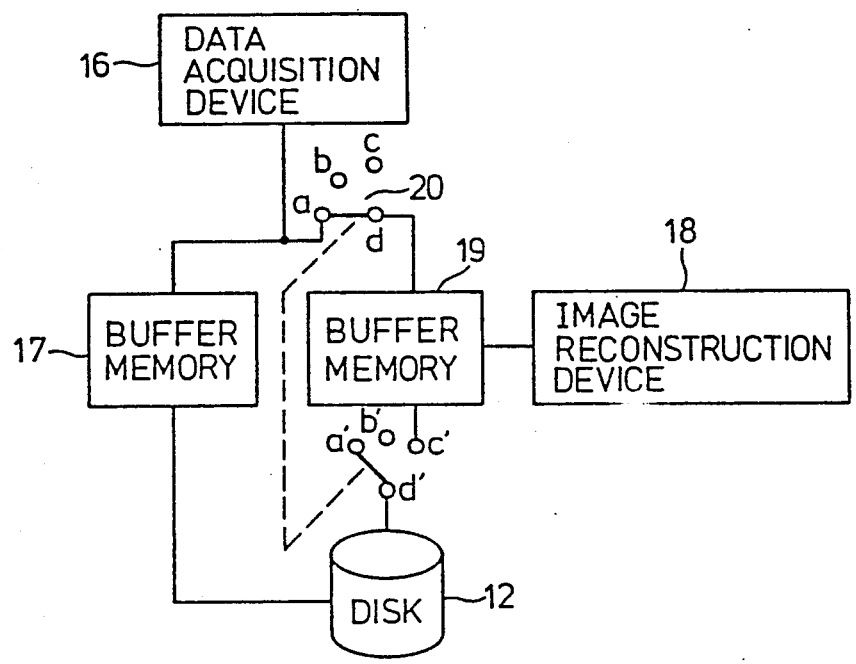
Figure 4:
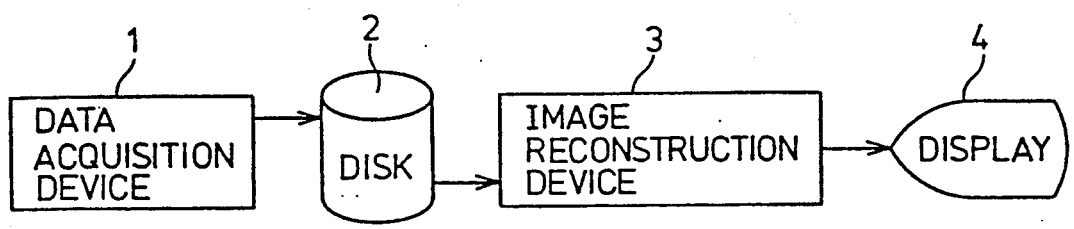
FIG. 4 is a conceptual block diagram of the conventional image forming apparatus.

Though the above embodiment deals with the case in which both the data acquisition device 11 and the image reconstruction device 14 respectively incorporate a buffer memory for one scan, if the data acquisition device does not incorporate a buffer memory, as shown in FIG. 2, a buffer memory 17 is interposed between the data acquisition device 16 and the intermediate buffer 12. If neither the data acquisition device nor the image reconstruction device incorporates a buffer memory, as shown in FIG. 3, the second buffer memory 19 is further provided to be used as a buffer device for data transferred between an image reconstruction device 18 and the data acquisition device 16 or the intermediate buffer 12. In that case, a change-over switch 20 comprising two interlocking devices is provided in an input circuit on the data acquisition device side of the buffer memory 19 and in an input circuit on the intermediate buffer side thereof, respectively, thereby alternatively switching input data of the buffer memory 19. Further, it goes without saying that a control device similar to that in the case of FIG. 1, not shown, exists in apparatus of FIGS. 2 and 3.

Though the above description deals with the best mode for carrying out the present invention, it is easy for persons having general knowledge of technical field to which the present invention belongs to make various modifications without departing from the scope of the appended claims.

We claim:

1. An image forming apparatus for computed tomography comprising
a data acquisition means for continuously scanning a detected body a plurality of times to obtain scan data of the body;
an intermediate buffer memory means connected to said data acquisition means for storing the scan data and having a sufficient capacity to store all of the scan data acquired by said data acquisition means;
a tomographic image reconstruction means for tomographically processing the scan data and for reconstructing a tomographic image of the detected body being scanned according to the scan data obtained by said data acquisition means; and
control means for connecting said data acquisition means and said intermediate buffer memory means to said tomographic image reconstruction means, and for applying the scan data from said data acquisition means to said tomographic image reconstruction means and concurrently to said intermediate buffer memory means, and after one sheet of image is tomographically reconstructed by said tomographic image reconstruction means, for applying scan data stored in said intermediate buffer means to said tomographic image reconstruction means so that the process of tomographic image reconstruction is started substantially concurrently with the start of obtaining and applying of the scan data by said data acquisition means.

2. The apparatus of claim 1, wherein said data acquisition means comprises a first buffer memory means having a sufficient storage capacity to store scan data of at least one scan.

3. The apparatus of claim 2, wherein said control means causes scan data to be transferred from said data acquisition means to said first buffer memory means contained in said data acquisition means and then therethrough to said intermediate buffer memory means, and to said tomographic image reconstruction menas.

4. The apparatus of claim 3, wherein said tomographic image reconstruction means comprises a second buffer memory means having a sufficient storage capacity to store scan data of at least one scan.

5. The apparatus of claim 4, wherein said control means causes scan data from said first buffer memory means and said intermediate buffer memory means to be applied to said second buffer memory means and therethrough to said tomographic image reconstruction means.

6. The apparatus of claim 1, wherein said tomographic image reconstruction means comprises a second buffer memory means having a sufficient storage capacity to store scan data of at least one scan.

7. The apparatus of claim 6, wherein said control means causes scan data from said data acquisition means and said intermediate buffer memory means to be applied to said second buffer memory means, and therethrough to said tomographic image reconstruction means.

8. The apparatus of claim 1, wherein said control means comprises a switch having at least three terminals, a first terminal thereof being connected to said data acquisition means, a second terminal thereof being connected to said intermediate buffer memory means, and a third terminal thereof being connected to said tomographic image reconstruction means.

9. An image forming apparatus for computed tomography comprising
a data acquisition means for continuously scanning a detected body a plurality of times to obtain scan data of the body;
a first buffer memory means connected to said data acquisition means for storing scan data of at least one scan and having a sufficient storage capacity to store scan data for at least one scan;
an intermediate buffer memory means connected to said first buffer memory means for storing scan data transmitted from said first buffer memory means and having a sufficient storage capacity to store all of the scan data acquired by said data acquisition means;
a tomographic image reconstruction means for tomographically processing the scan data and for reconstructing tomographic image of the body being scanned according to the scan data obtained by said data acquisition means; and control means for connecting said first buffer memory means and said intermediate buffer memory means to said tomographic image reconstruction means so as to cause scan data from said data acquisition means to be applied to said first buffer memory means and then therethrough to said intermediate buffer memory means while concurrently causing the scan data from said first buffer memory means to be applied to said tomographic image reconstruction means to tomographically reconstruct one sheet of image, and then to cause scan data from said intermediate buffer memory means to be applied to said tomographic image reconstruction means, whereby the process of tomographic image reconstruction is started substantially concurrently with the obtaining and applying of scan data by said data acquisition means.

10. The apparatus of claim 9, wherein said tomographic image reconstruction means comprises a second buffer memory means having a sufficient storage capacity to store scan data of at least one scan.

11. The apparatus of claim 10, wherein said control means causes scan data from said first buffer memory means and said intermediate buffer memory means to be applied to said second buffer memory means and then therethrough to said tomographic image reconstruction means.

12. The apparatus of claim 9, wherein said control means comprises a switch having at least three terminals, one terminal connected to said first buffer memory means, another terminal connected to said tomographic image reconstruction means, and a further terminal connected to said intermediate buffer memory means.

13. An image forming apparatus for computed tomography comprising
a data acquistion means for continuously scanning a detected body a plurality of times to obtain scan data of the body;
a first buffer memory means connected to said data acquisition means for storing scan data of at least one scan and having a sufficient storage capacity to store scan data for at least one scan;
an intermediate buffer memory means connected to said first buffer memory means for storing scan data transmitted by said first buffer memory means and having a sufficient storage capacity to store all of the scan data acquired by said data acquisition means;
a second buffer memory means connected to said first buffer memory means or to said intermediate buffer memory means, for storing the scan data of at least one scan transmitted from said first buffer memory means or from said intermediate buffer memory means, and having a sufficient storage capacity to store scan data for at least one scan;
a tomographic image reconstruction means connected to said second buffer memory means, for tomographically reconstructing a tomographic image of the body being scanned according to the scan data obtained by said data acquisition means; and
control means for connecting said first buffer memory means and said intermediate buffer memory means to said second buffer memory means so as to cause scan data from said data acquisition means to be applied to said first buffer memory means and therethrough to said intermediate buffer memory means and concurrently cause scan data from said data acquisition means to be applied through said first buffer memory means to said second buffer memory means and then therethrough to said tomograhic image reconstruction means whereat a tomographic image is tomographically reconstructed, and after one sheet of image is tomographically reconstructed, to cause scan data from said intermediate buffer memory means to be applied to said second buffer memory means and therethrough to said tomographic image reconstruction means, whereat start of the processing of tomographic image reconstruction is substantially concurrent with the obtaining and applying of scan data by said data acquistion means.

14. The apparatus of claim 13, wherein said control means comprises a pair of switches.

* * * * *